(12) United States Patent
Lee et al.

(10) Patent No.: US 10,671,223 B2
(45) Date of Patent: Jun. 2, 2020

(54) ORGANIC LIGHT EMITTING DISPLAY APPARATUS WITH FORCE AND TOUCH SENSING

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 15/480,374

(22) Filed: Apr. 6, 2017

(65) Prior Publication Data

US 2018/0292930 A1 Oct. 11, 2018

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 3/0412* (2013.01); *G06F 2203/04105* (2013.01); *G06F 2203/04107* (2013.01)

(58) Field of Classification Search
CPC ...... G06F 3/044; G06F 3/0414; G06F 3/0416; G06F 3/0412
See application file for complete search history.

(56) References Cited

U.S. PATENT DOCUMENTS

| 2013/0278516 | A1* | 10/2013 | Nagata | G06F 3/041 345/173 |
| 2014/0043247 | A1* | 2/2014 | Singh | G06F 1/3218 345/173 |
| 2014/0062937 | A1* | 3/2014 | Schwartz | G06F 3/0418 345/174 |
| 2016/0202814 | A1* | 7/2016 | Lee | G06F 3/044 345/173 |

(Continued)

FOREIGN PATENT DOCUMENTS

| CN | 105068695 A | 11/2015 |
| TW | 200919285 A | 5/2009 |

(Continued)

OTHER PUBLICATIONS

Office Action dated Mar. 28, 2019 of the corresponding Taiwan patent application.

*Primary Examiner* — Yuzhen Shen
(74) *Attorney, Agent, or Firm* — Chun-Ming Shih; HDLS IPR Services

(57) ABSTRACT

An organic light emitting display apparatus with force and touch sensing includes a touch protection layer, a touch electrode layer, a resilient material layer, a force electrode layer, a thin-film-encapsulation layer, a common electrode layer, an organic light emitting material layer and a thin film transistor substrate from top to bottom. The thin film transistor substrate includes a pixel electrode layer, a thin film transistor layer and a transistor substrate from top to bottom. The organic light emitting display apparatus further includes a display controller to drive the organic light emitting material layer and a force touch controller for sensing touch position on the touch electrode layer and force exerted on the force electrode layer.

19 Claims, 17 Drawing Sheets

(56) References Cited

U.S. PATENT DOCUMENTS

| | | | |
|---|---|---|---|
| 2017/0045992 A1* | 2/2017 | Lee | G06F 3/0416 |
| 2017/0192508 A1* | 7/2017 | Lim | G06F 3/016 |
| 2017/0192596 A1* | 7/2017 | Lee | G02F 1/13306 |
| 2017/0207276 A1* | 7/2017 | Miyamoto | H01L 51/5246 |
| 2017/0235414 A1* | 8/2017 | Ding | G06F 3/0416 |
| | | | 345/174 |
| 2017/0277295 A1* | 9/2017 | Reynolds | G06F 3/044 |
| 2017/0308212 A1* | 10/2017 | Jin | G06F 3/0412 |
| 2018/0032198 A1* | 2/2018 | Suzuki | G06F 3/0414 |
| 2018/0046298 A1* | 2/2018 | Weng | G02F 1/13338 |
| 2018/0095581 A1* | 4/2018 | Hwang | H01L 27/323 |
| 2018/0166507 A1* | 6/2018 | Hwang | H01L 27/323 |

FOREIGN PATENT DOCUMENTS

| | | |
|---|---|---|
| TW | I559192 B | 11/2016 |
| TW | 201706816 A | 2/2017 |

* cited by examiner

ORGANIC LIGHT EMITTING DISPLAY APPARATUS WITH FORCE AND TOUCH SENSING

BACKGROUND OF THE INVENTION

Field of the Invention

The present invention relates to an organic light emitting display apparatus, especially to an organic light emitting display apparatus with force and touch sensing.

Description of Prior Art

The touch display panels become popular as the market growing of the compact and lightweight mobile device. The pressure touch control technology has rapid development owing to the maturity of touch-control user interface and serious demand for 3D touch operation. Meanwhile, the organic light emitting display apparatus includes advantages like lightweight, backlight unneeded, wide perspective, power-saving and flexible, thus gradually becomes a main type of display on mobile device. Therefore, it is a common object to develop an organic light emitting display including force sensing and touch sensing functions.

The conventional force and touch control panel generally integrates microelectromechanical sensor at edge or corner of the display panel to sense tactile pressure on the display panel. The cost of the sensor is high and the assembling of the sensor is difficult. Besides, voltage-resistance converting material including conductive rubber, or conductive sponge can detect the force and variation of resistance by measuring variation of current, but the power consuming is high and accuracy is not good, the aforementioned technology cannot sense the proximity of object, thus it still needs lots of effort to improve the force and touch display device.

SUMMARY OF THE INVENTION

It is an object to provide an organic light emitting display apparatus with force and touch sensing to overcome above-mentioned problems.

Accordingly, the present invention provides an organic light emitting display apparatus with force and touch sensing, the organic light emitting display apparatus includes: a thin film transistor substrate; an organic light emitting material layer arranged on the thin film transistor substrate; a common electrode layer arranged on the organic light emitting material layer, making the organic light emitting material layer arranged between the common electrode layer and the thin film transistor substrate; a force electrode layer arranged on a side of the common electrode layer, the side being opposite to the organic light emitting material layer; a touch electrode layer arranged on a side of the force electrode layer, the side being opposite to the organic light emitting material layer; and a resilient material layer arranged between the force electrode layer and the touch electrode layer, or arranged between the common electrode layer and the force electrode layer. The force electrode layer includes at least a force sensing electrode. The touch electrode layer includes a plurality of touch electrodes.

The present invention can make the organic light emitting display include force sensing and touch functions.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1A:
FIG. 1A shows a stack diagram of an organic light emitting display apparatus with force and touch sensing according to a first embodiment of the present invention.
Figure 9:
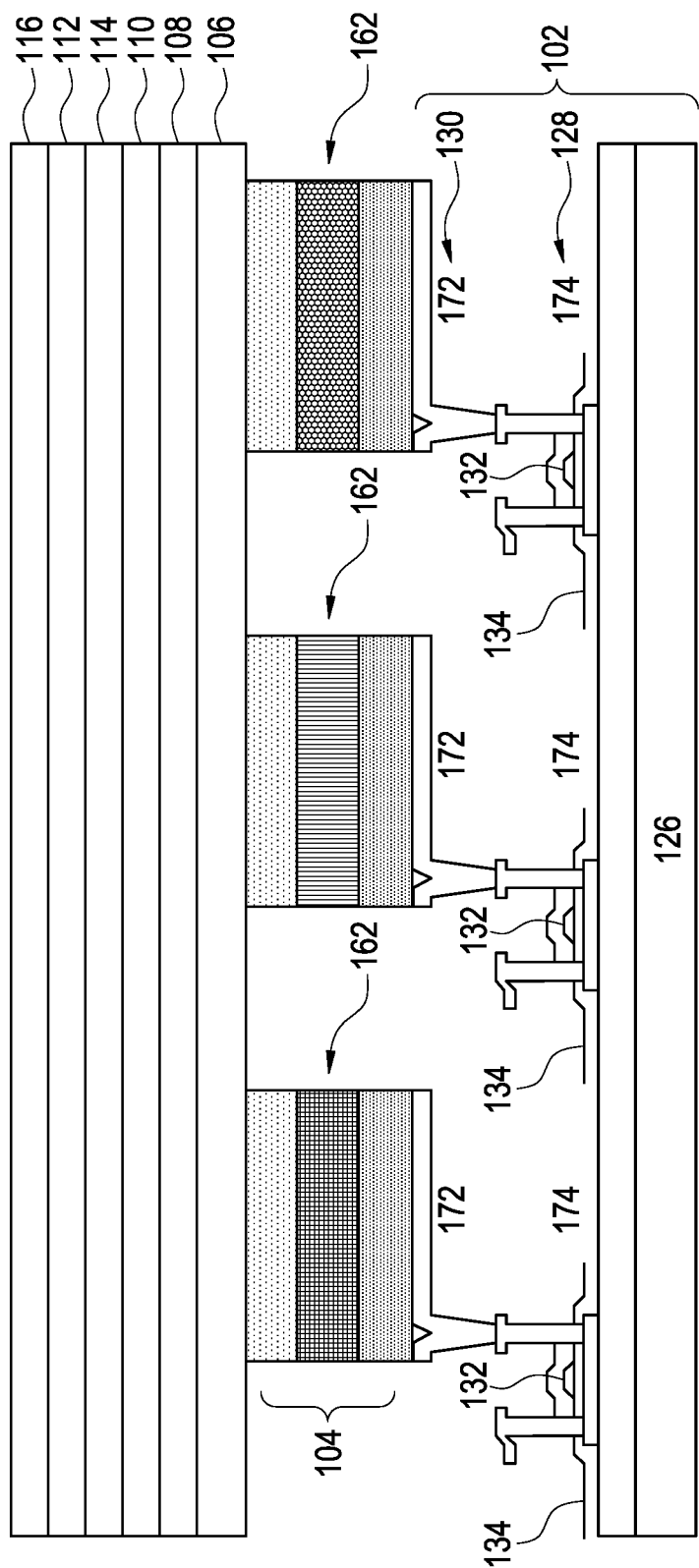
FIG. 9 shows a schematic view of a structure corresponding to FIG. 1A.

Please refer to FIG. 1A, FIG. 1A shows a stack diagram of an organic light emitting display apparatus with force and touch sensing according to a first embodiment of the present invention. Also refer to FIG. 9, FIG. 9 shows a schematic view of a structure corresponding to FIG. 1A. As shown in FIG. 1, the present invention provides an organic light emitting display apparatus 10 with force and touch sensing (hereafter organic light emitting display apparatus 10), the organic light emitting display apparatus 10 includes, from top to bottom, a touch protection layer 116, a touch electrode layer 112, a resilient material layer 114, a force electrode layer 110, a thin-film-encapsulation (TFE) layer 108, a common electrode layer 106, an organic light emitting material layer 104 and a thin film transistor substrate 102, where the thin film transistor substrate 102 includes, from top to bottom, a pixel electrode layer 130, a thin film transistor layer 128 and a transistor substrate 126.

The touch protection layer 116 is arranged on a side of the touch electrode layer 112, and the side is opposite to the resilient material layer 114. The touch protection layer 116 is a substrate or a cured coating layer, like glass or polymer material (such as, PI, PE, PET etc.). The touch electrode layer 112 is arranged on a side of the force electrode layer 110, the side is opposite to the organic light emitting material layer 104. The resilient material layer 114 is arranged between the force electrode layer 110 and the touch electrode layer 112. The resilient material layer 114 is compressively deformed under pressure, and restores to original shape and volume if pressure is not present. The force electrode layer 110 is arranged on a side of the common electrode layer 106, the side is opposite to the organic light emitting material layer 104, and the force electrode layer 110 is preferably made of transparent conductive material, such as indium tin oxide (ITO). The thin-film-encapsulation layer 108 may also be used as substrate or protection layer, for isolating water or air, and may be arranged on the force electrode layer 110 and the common electrode layer 106. The common electrode layer 106 is arranged on the organic light emitting material layer 104, making the organic light emitting material layer 104 arranged between the common electrode layer 106 and the thin film transistor substrate 102.

Refer to FIG. 9, the pixel electrode layer 130 includes a plurality of pixel electrodes 172, the thin film transistor layer 128 includes a plurality of thin film transistors 174. The pixel electrodes 172 are arranged on the thin film transistor layer 128, and the plurality of pixel electrodes 172 have polarity opposite to that of the common electrode layer 106 (i.e. if the pixel electrode 172 is anode, the common electrode layer 106 is cathode; if the pixel electrode 172 is cathode, the common electrode layer 106 is anode). The thin film transistors 174 are arranged on the transistor substrate 126. The thin film transistor substrate 102 further includes a plurality of gate lines 132 and a plurality of data lines 134, the gate lines 132 are electrically connected to the thin film transistors 174, the data lines 134 are electrically connected to the thin film transistors 174. Besides, the organic light emitting material layer 104 includes a plurality of organic light emitting materials 162. As the shown in FIG. 9, the colors of the organic light emitting materials 162 in the organic light emitting material layer 104 are different from each other, for example, the organic light emitting materials 162 respectively are materials emitting red light, green light, and blue light.

Figure 1B:
FIG. 1B shows a stack diagram of an organic light emitting display apparatus with force and touch sensing according to a second embodiment of the present invention.
Figure 10:
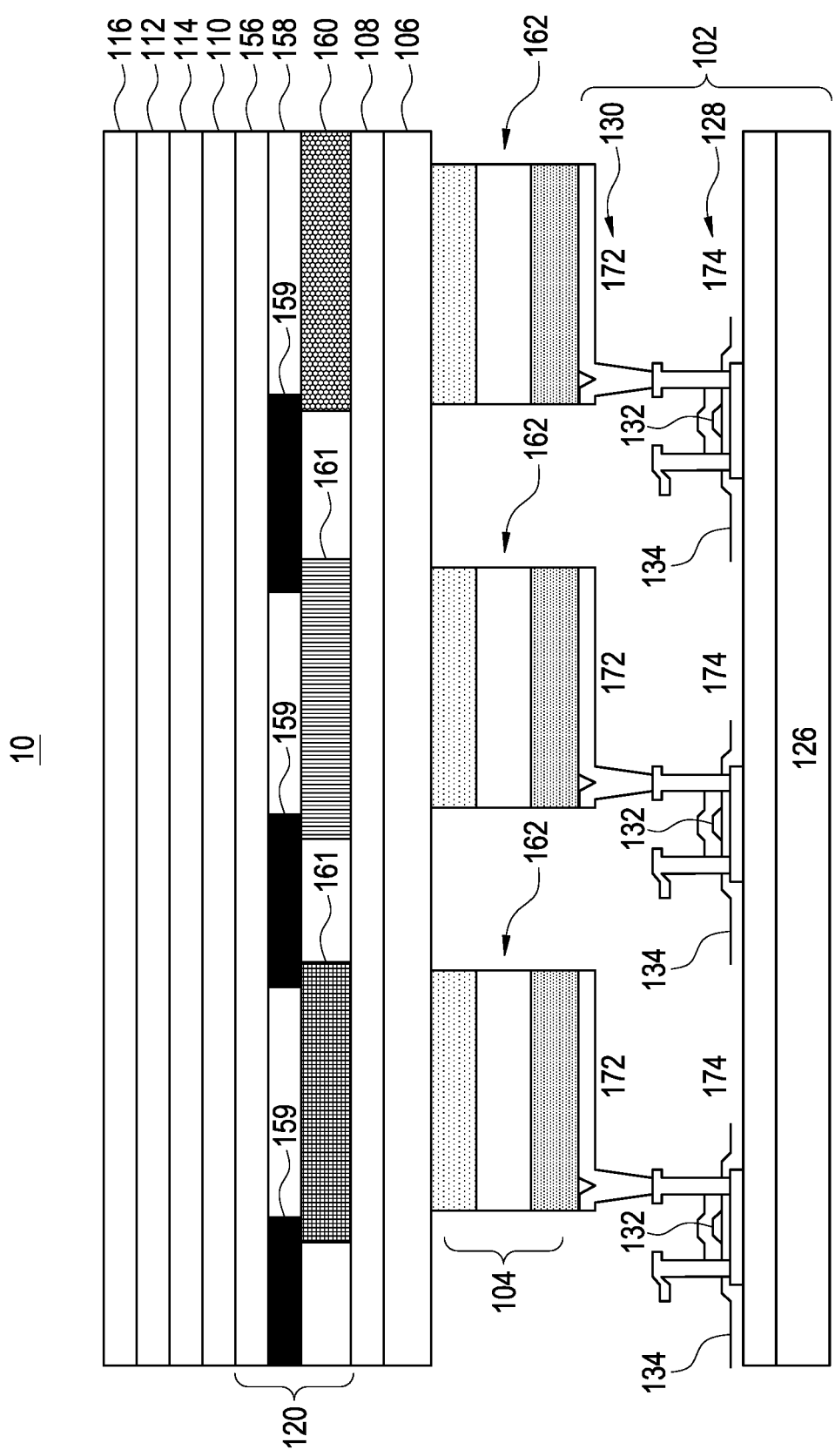
FIG. 10 shows a schematic view of a structure corresponding to FIG. 1B.

Please refer to FIG. 1B, FIG. 1B shows a stack diagram of an organic light emitting display apparatus with force and touch sensing according to a second embodiment of the present invention. The elements shown in FIG. 1B, which are the same as that in FIG. 1A, are not described repeatedly for brevity. As the embodiment shown in FIG. 1B, the organic light emitting display apparatus 10 further includes a color filtering structure 120, the color filtering structure 120 is arranged between the force electrode layer 110 and the thin-film-encapsulation layer 108. FIG. 10 shows a schematic view of a structure corresponding to FIG. 1B, the color filtering structure 120 includes a color filtering substrate 156, a black matrix layer 158 and a color filtering material layer 160. The black matrix layer 158 is used to block the skewed light. The black matrix layer 158 and the color filtering material layer 160 are arranged on the color filtering substrate 156. As the shown in FIG. 10, all of the organic light emitting materials 162 in the organic light emitting material layer 104 can be the same material for emitting white light, while the color filtering materials 161 are different from each other, the colors of the color filtering materials 161 respectively are red, green and blue.

Figure 3A:
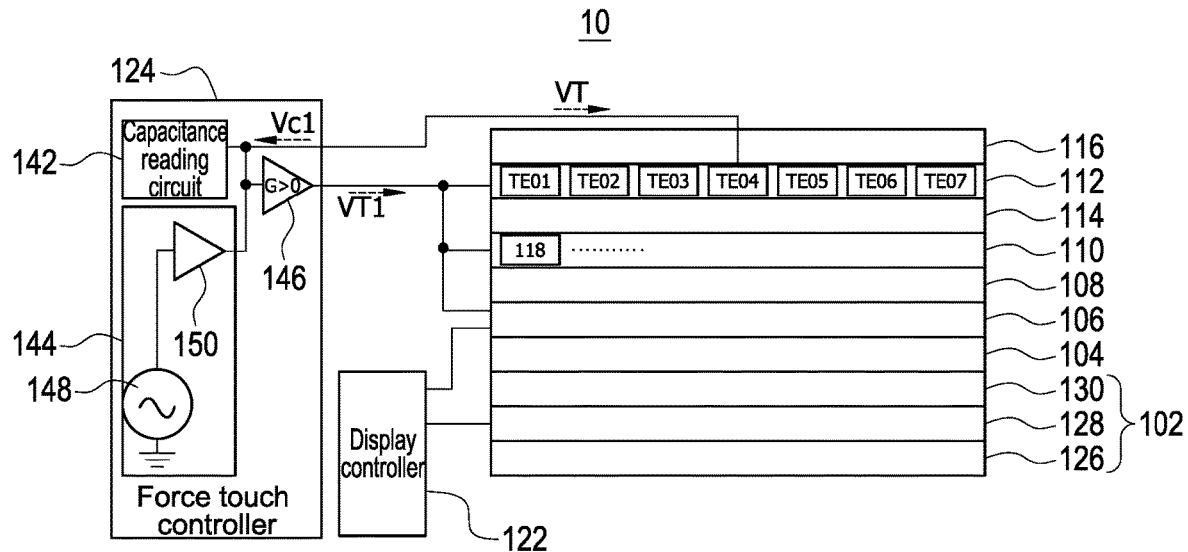
FIG. 3A shows a block diagram including circuit of the organic light emitting display apparatus with force and touch sensing according to the first embodiment of the present invention.
Figure 3B:
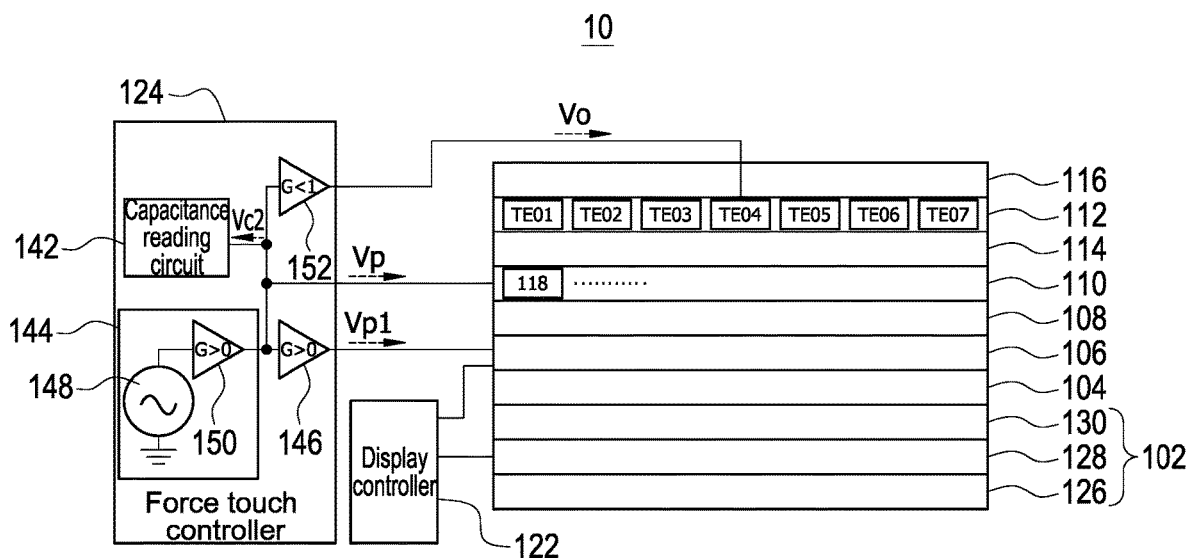
FIG. 3B shows a block diagram including circuit of the organic light emitting display apparatus with force and touch sensing according to the first embodiment of the present invention.
Figure 6:
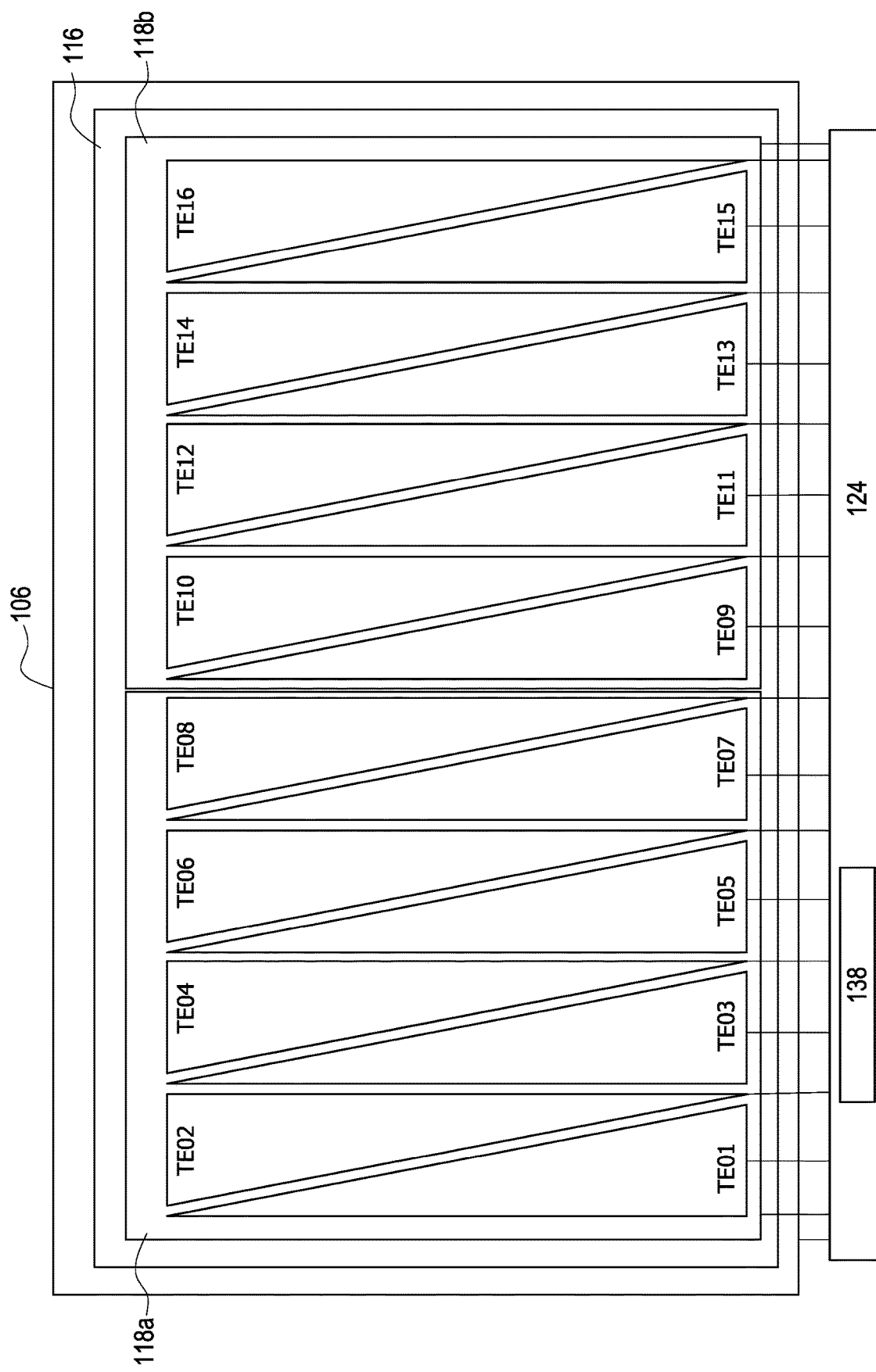
FIG. 6 shows a partial top view corresponding to embodiments shown in FIGS. 1A and 1B.

Please refer to FIGS. 3A and 3B, showing a block diagram including circuit of the organic light emitting display apparatus with force and touch sensing according to the first embodiment of the present invention. The signal measuring schemes shown in FIGS. 3A and 3B can be applied to the embodiment in FIGS. 1A and 1B. In the present invention, the organic light emitting display apparatus 10 further includes a display controller 122 and a force touch controller 124. The display controller 122 is electrically connected to the thin film transistor substrate 102 and the common electrode layer 106. The force touch controller 124 is electrically connected to the common electrode layer 106, the force electrode layer 110 and the touch electrode layer 112. The touch electrode layer 112 includes a plurality of touch sensing electrodes TE01-07, and the touch sensing electrodes TE01-07 can be, for example but not limited to, transparent conductive electrodes. The force electrode layer 110 includes at least a force sensing electrode 118, the force sensing electrode 118 can be, for example but not limited to, a transparent conductive electrode. The force touch controller 124 includes a capacitance reading circuit 142, a capacitance exciting driving circuit 144 and a first amplifier 146. The capacitance exciting driving circuit 144 includes a signal source 148 and a signal end driver 150. The elements mentioned above are electrically connected with each other, and a gain G (i.e. amplification) of the first amplifier 146 is larger than 0. Refer to FIG. 6 together, FIG. 6 shows a partial top view corresponding to embodiments shown in FIGS. 1A and 1B. In the present invention, the organic light emitting display apparatus 10 includes a plurality of touch sensing electrodes TE01-16 and two force sensing electrodes 118a and 118b, and a total area of the touch sensing electrodes TE01-16 cover more than 90 percentage of an area of the force sensing electrodes 118a and 118b.

In the following, touch and force sensing of the organic light emitting display apparatus 10 of the present invention is further described with reference to FIGS. 3A and 3B. Refer to FIG. 3A, during touch sensing, the force touch controller 124 generates an alternating touch capacitance-exciting signal VT, and transmits touch capacitance exciting signal VT sequentially or randomly to a selected touch sensing electrode (as the touch sensing electrode TE04 shown in FIG. 3A), and receives a touch sensing signal Vc1 at the selected touch sensing electrode TE04 for touch sensing. Meanwhile, the first amplifier 146 generates an auxiliary signal VT1 with same phase as that of the touch capacitance exciting signal VT, and transmits the auxiliary signal VT1 to a part of non-selected touch sensing electrode (for example, touch sensing electrodes TE03 and TE05 surrounding the selected touch sensing electrode TE04), corresponding force sensing electrode 118 and the common electrode layer 106. The corresponding force sensing electrode 118 mentioned above is the force sensing electrode overlapping or closest to the selected touch electrode TE04 from the projection view. Also refer to the embodiment shown in FIG. 6, the force sensing electrode corresponding to the touch electrode TE04 is the force sensing electrode 118a. There is almost no voltage difference between the selected touch sensing electrode TE04 and the corresponding force sensing electrode 118a, thus reducing the influence of the resilient material layer 114 compressively deformed or warped under pressures. A signal applied with same phase surrounding the selected touch sensing electrode TE04 further makes the electric field lines more centralized at the selected touch sensing electrode TE04, increasing sensitivity of sensing.

Refer to FIG. 3B, the force touch controller 124 generates an alternating force capacitance-exciting signal Vp during a force sensing, and transmits the force capacitance-exciting signal Vp to the force sensing electrode 118 corresponding to the selected touch sensing electrode TE04, and receives a force sensing signal Vc2 from the corresponding force sensing electrode 118 for force sensing. Meanwhile, the first amplifier 146 generates a shielding signal Vp1 with same phase as that of the force capacitance-exciting signal Vp, and transmits the shielding signal Vp1 to the common electrode layer 106, for shielding noise interference from the thin film transistor substrate 102. Besides, a second amplifier 152 (gain is smaller than 1) generates a counter exciting signal Vo with phase opposite to the force capacitance exciting signal Vp (or with a gain smaller than 1 and same phase as that of and the force capacitance exciting signal Vp), and applies the counter exciting signal Vo to the selected touch sensing electrode TE04, for shielding the finger interference. The counter exciting signal Vo also can be a dc volt signal.

Besides, in operations shown in FIGS. 3A and 3B, the display controller 122 sequentially outputs a gate signal to the gate line 132 shown in FIG. 9, and the display controller 122 outputs the data signal to the plurality of data lines 134 shown in FIG. 9 and outputs a dc volt signal to the common electrode layer 106 for displaying operation.

Figure 2A:
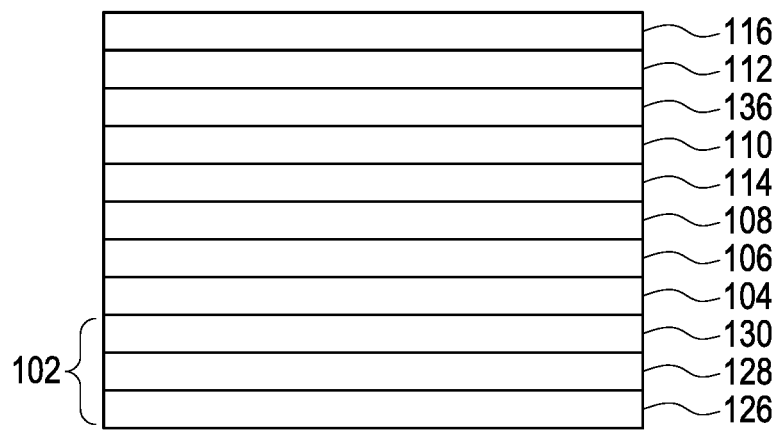
FIG. 2A shows a stack diagram of an organic light emitting display apparatus with force and touch sensing according to a third embodiment of the present invention.
Figure 2B:
FIG. 2B shows a stack diagram of an organic light emitting display apparatus with force and touch sensing according to a fourth embodiment of the present invention.
Figure 11:
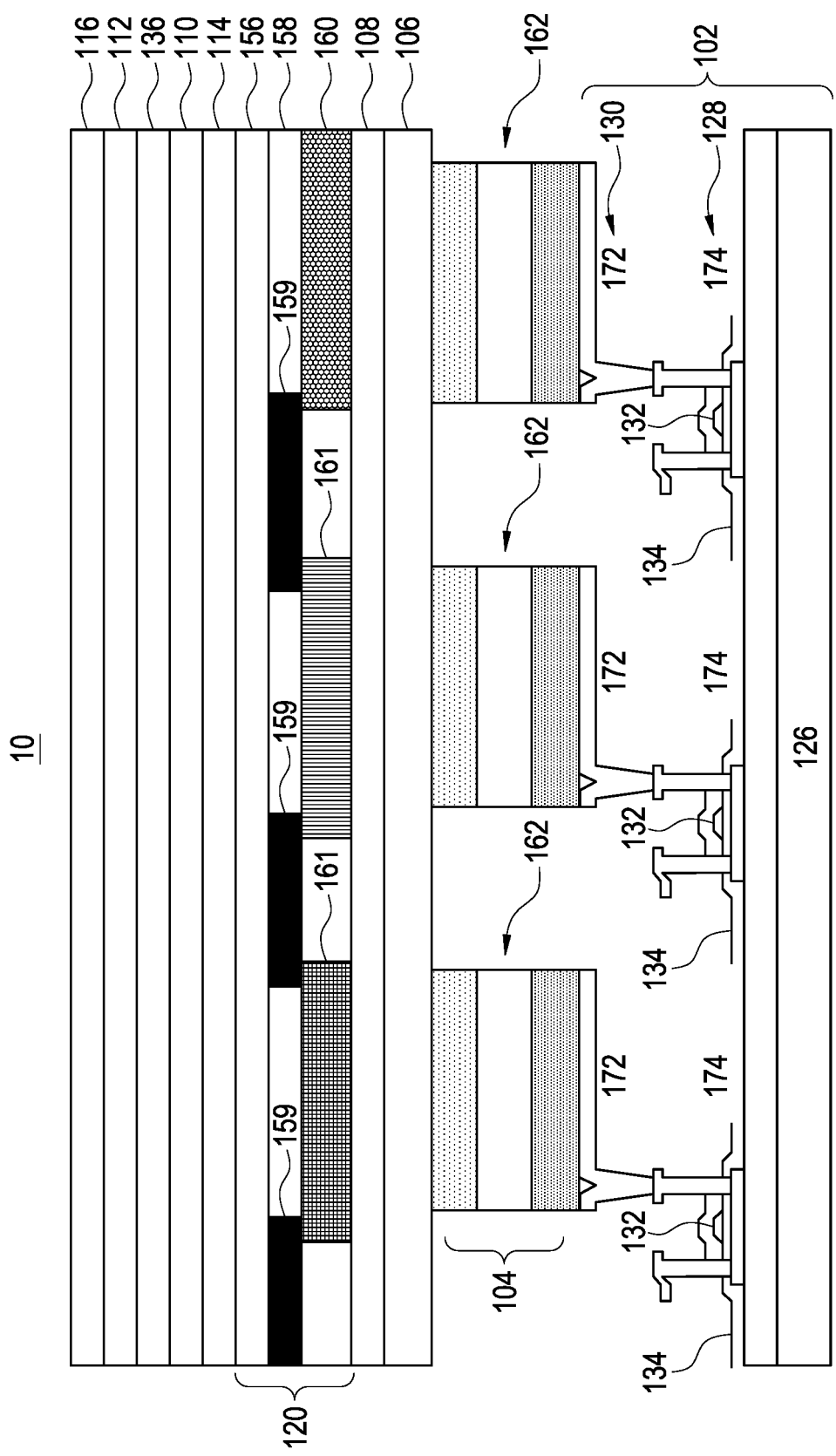
FIG. 11 shows a schematic view of a structure corresponding to FIG. 2B.

Please refer to FIG. 2A, FIG. 2A shows a stack diagram of an organic light emitting display apparatus with force and touch sensing according to a third embodiment of the present invention. The elements shown in FIG. 2A, which are the same as that in FIG. 1A, are not described repeatedly for brevity. In the embodiment shown in FIG. 2A, the organic light emitting display apparatus 10 further includes an insulation layer 136, the insulation layer 136 is arranged between the touch electrode layer 112 and the force electrode layer 110, while the resilient material layer 114 is arranged between the common electrode layer 106 and the force electrode layer 110. Please refer to FIG. 2B, FIG. 2B shows a stack diagram of an organic light emitting display apparatus with force and touch sensing according to a fourth embodiment of the present invention. The elements shown in FIG. 2B, which are the same as that in FIG. 2A, are not described repeatedly for brevity. As the embodiment shown in FIG. 2B, the organic light emitting display apparatus 10 further includes a color filtering structure 120, the color filtering structure 120 is arranged between the resilient material layer 114 and the thin-film-encapsulation layer 108. Refer to FIG. 11, FIG. 11 shows a schematic view of a structure corresponding to FIG. 2B, and the description of FIGS. 9 and 10 can be referred correspondingly. Similarly, as shown in FIG. 11, all of the organic light emitting materials 162 in the organic light emitting material layer 104 are the same material for emitting white light, and the colors of the color filtering material 161 are different from each other, such as red, green and blue color.

Figure 4A:
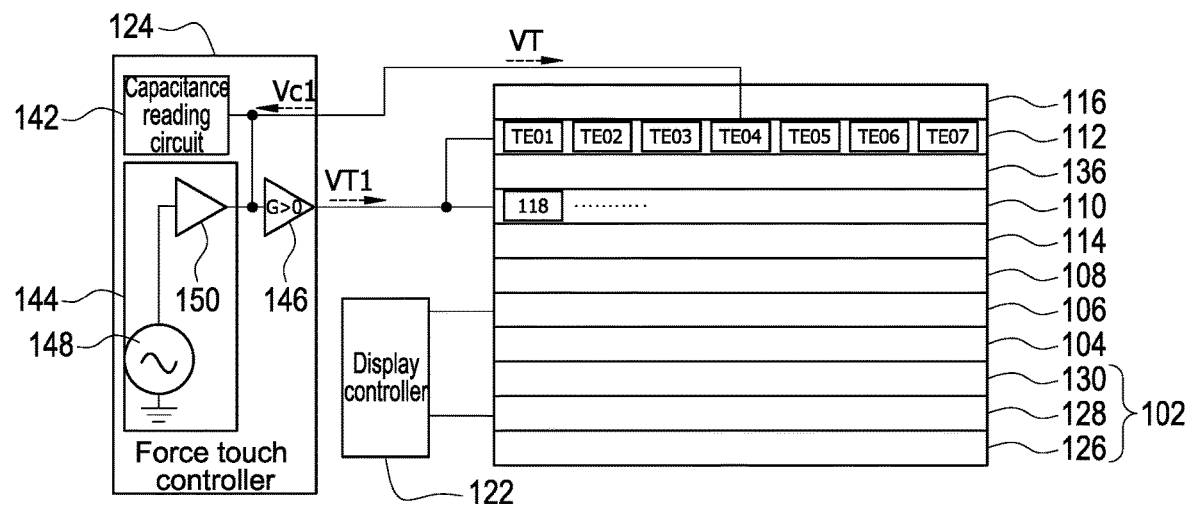
FIG. 4A shows a block diagram including circuit of the organic light emitting display apparatus with force and touch sensing according to the second embodiment of the present invention.
Figure 4B:
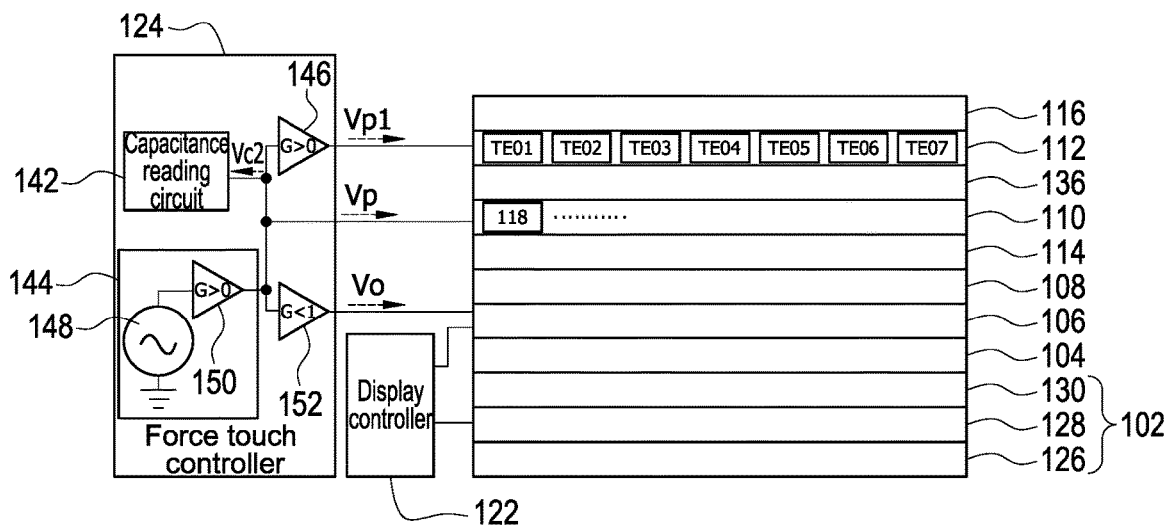
FIG. 4B shows a block diagram including circuit of the organic light emitting display apparatus with force and touch sensing according to the second embodiment of the present invention.

Please refer to FIGS. 4A and 4B, showing a block diagram including circuit of the organic light emitting display apparatus with force and touch sensing according to the second embodiment of the present invention. As the shown in FIGS. 4A and 4B, the signal measuring can be adopted to the embodiment shown in FIGS. 2A and 2B. Similarly, in the present invention, the organic light emitting display apparatus 10 further includes a display controller 122 and a force touch controller 124. The display controller 122 is electrically connected to the thin film transistor substrate 102 and the common electrode layer 106. The force touch controller 124 is electrically connected to the force electrode layer 110 and the touch electrode layer 112. The touch electrode layer 112 includes a plurality of touch sensing electrodes TE01-07, and the touch sensing electrodes TE01-07 can be, for example but not limited to, transparent conductive electrodes. The force electrode layer 110 includes at least a force sensing electrode 118, the force sensing electrode 118 can be, for example but not limited to, a transparent conductive electrode. The force touch controller 124 includes a capacitance reading circuit 142, a capacitance exciting driving circuit 144 and a first amplifier 146. The capacitance exciting driving circuit 144 includes a signal source 148 and a signal end driver 150. The elements mentioned above are electrically connected with each other, and a gain G (i.e. amplification) of the first amplifier 146 is larger than 0. FIG. 6 can also show a partial top view corresponding to embodiments shown in FIGS. 2A and 2B. For example, in the present invention, the organic light emitting display apparatus 10 includes a plurality of touch sensing electrodes TE01-16 and two force sensing electrodes 118a and 118b, and a total area of the sensing touch electrodes TE01-16 covers more than 90 percentage of the area of the force sensing electrodes 118a and 118b.

Refer to FIGS. 4A and 4B, touch and force sensing of organic light emitting display apparatus 10 (corresponding to embodiments in FIGS. 2A and 2B) of the present invention is further described. Refer to FIG. 4A, during touch sensing, the force touch controller 124 generates an alternating touch capacitance exciting signal VT, and transmits the touch capacitance exciting signal VT sequentially or randomly to a selected touch sensing electrode (such as touch sensing electrode TE04 shown in FIG. 4A), and receives a touch sensing signal Vc1 from the selected touch electrode TE04 for touch sensing. Meanwhile, the first amplifier 146 generates an auxiliary signal VT1 with same phase as that of the touch capacitance exciting signal VT, and transmits the auxiliary signal VT1 to a part of non-selected touch sensing electrode (for example, touch sensing electrodes TE03 and TE05 surrounding the selected touch electrode TE04) and corresponding force sensing electrode 118. The corresponding force sensing electrode 118 mentioned above is the force sensing electrode overlapping or closest to the selected touch electrode TE04 from the projection view. Also refer to the embodiment shown in FIG. 6, the force sensing electrode corresponding to the touch sensing electrode TE04 is the force sensing electrode 118a. There is almost no voltage difference between the selected touch electrode TE04 and the corresponding force sensing electrode 118a, thus reducing the influence of the resilient material layer 114 compressively deformed or warped under pressures. A signal applied with same phase surrounding the selected touch electrode TE04 further makes the electric field lines more centralized at the selected touch electrode TE04, increasing sensitivity of sensing.

Refer to FIG. 4B, the force touch controller 124 generates an alternating force capacitance exciting signal Vp during force sensing, and transmits the force capacitance exciting signal Vp to the force sensing electrode 118 corresponding to the selected touch sensing electrode TE04, and receives a force sensing signal Vc2 from the corresponding force sensing electrode 118 for force sensing. Meanwhile, the first amplifier 146 generates a shielding signal Vp1 with same phase as that of the force capacitance exciting signal Vp, and transmits the shielding signal Vp1 to the touch sensing electrodes TE01-TE07, for shielding finger interference. Besides, a second amplifier 152 (gain is smaller than 1) generates a counter exciting signal Vo with phase opposite to the force capacitance exciting signal Vp (or with a gain smaller than 1 and same phase as that of and the force capacitance exciting signal Vp), and applies the counter exciting signal Vo to the common electrode layer 106, for shielding noise interference from the thin film transistor substrate 102. The counter exciting signal Vo also can be a dc volt signal. Besides, in operation shown in FIGS. 4A and 4B, the display controller 122 sequentially outputs a gate signal to the gate line 132 shown in FIG. 9, and the display controller 122 outputs data signal to the plurality of data lines 134 shown in FIG. 9 and outputs a dc volt signal to the common electrode layer 106 for displaying operation.

The touch technology shown in FIGS. 5A-5C in the following is the mutual-capacitance type.

Figure 5A:
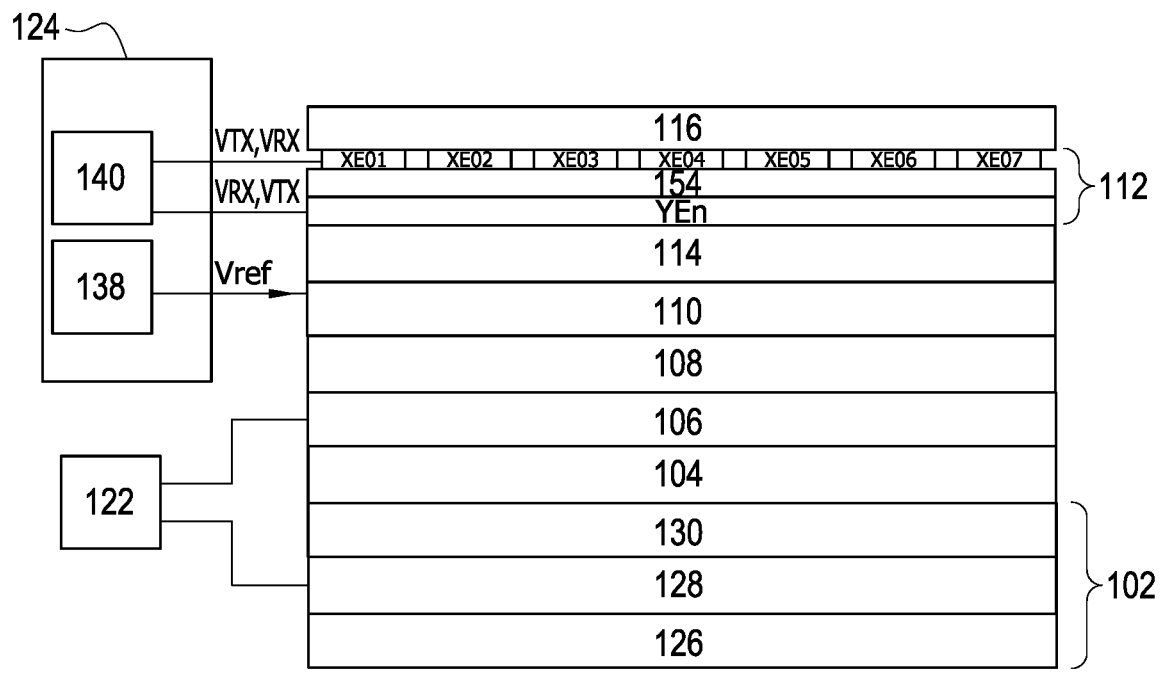
FIG. 5A shows a block diagram including circuit of the organic light emitting display apparatus with force and touch sensing according to an embodiment of the present invention.

Please refer to FIG. 5A, FIG. 5A shows a block diagram including circuit of the organic light emitting display apparatus with force and touch sensing according to an embodiment of the present invention. The elements shown in FIG. 5A, the elements with the same numeral/name as that in figures mentioned above are not described repeatedly here for brevity. The touch electrode layer 112 includes the plurality of first touch electrodes XE01-07, at least a second touch electrode YEn and a touch insulation layer 154. The touch insulation layer 154 is arranged between the first touch electrodes XE01-07 and the second touch electrode YEn. The force touch controller 124 includes a self-capacitance sensing circuit 138 and a mutual-capacitance sensing circuit 140. The self-capacitance sensing circuit 138 is connected to the force electrode layer 110. The mutual-capacitance sensing circuit 140 is connected to the touch electrode layer 112.

The force touch controller 124 sequentially or randomly outputs an alternating touch driving signal VTX to a selected second touch electrode YEn, and receives a touch sensing signal VRX from another relative touch electrode (i.e. one of the first touch electrodes XE01-07) for touch sensing. According to another method, the force touch controller 124 sequentially or randomly outputs an alternating touch driving signal VTX to a selected first touch electrode XE01-07, and receives a touch sensing signal VRX from another relative touch electrode (i.e. the second touch electrode YEn) for touch sensing. Meanwhile, the self-capacitance sensing circuit 138 transmits a dc reference voltage Vref to the force electrode layer 110 to avoid influence and interference of the resilient material layer 114 being compressively deformed and to determine the touch position accurately. By sensing the touch sensing signal VRX, it can be known that if there is touching on the cross position of the corresponding selected touch electrode (such as one of XE01-07) and another touch electrode (such as YEn).

Figure 7:
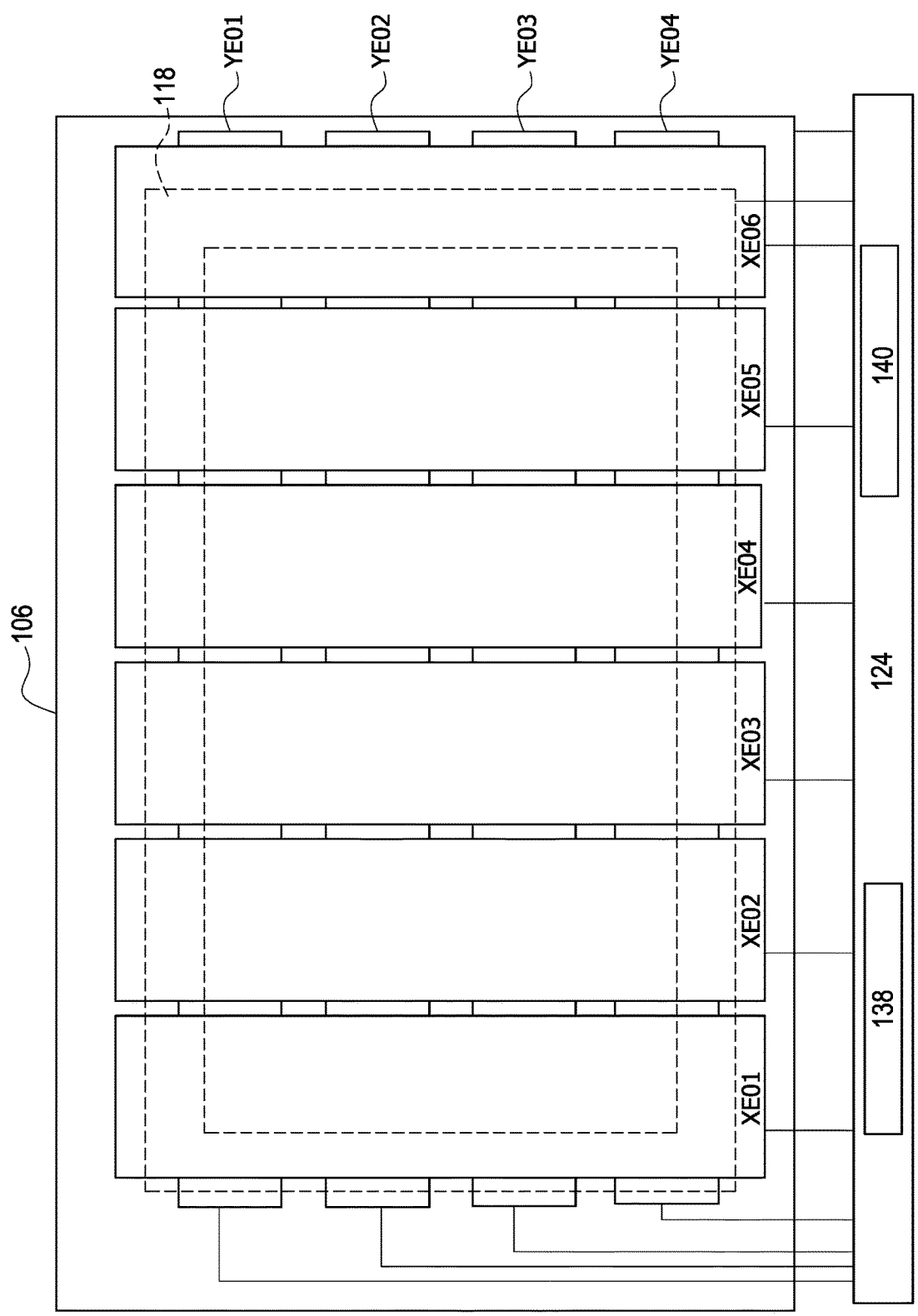
FIG. 7 shows a schematic view of an electrode distribution when the organic light emitting display apparatus of the present invention sensing mutual-capacitance.
Figure 8:
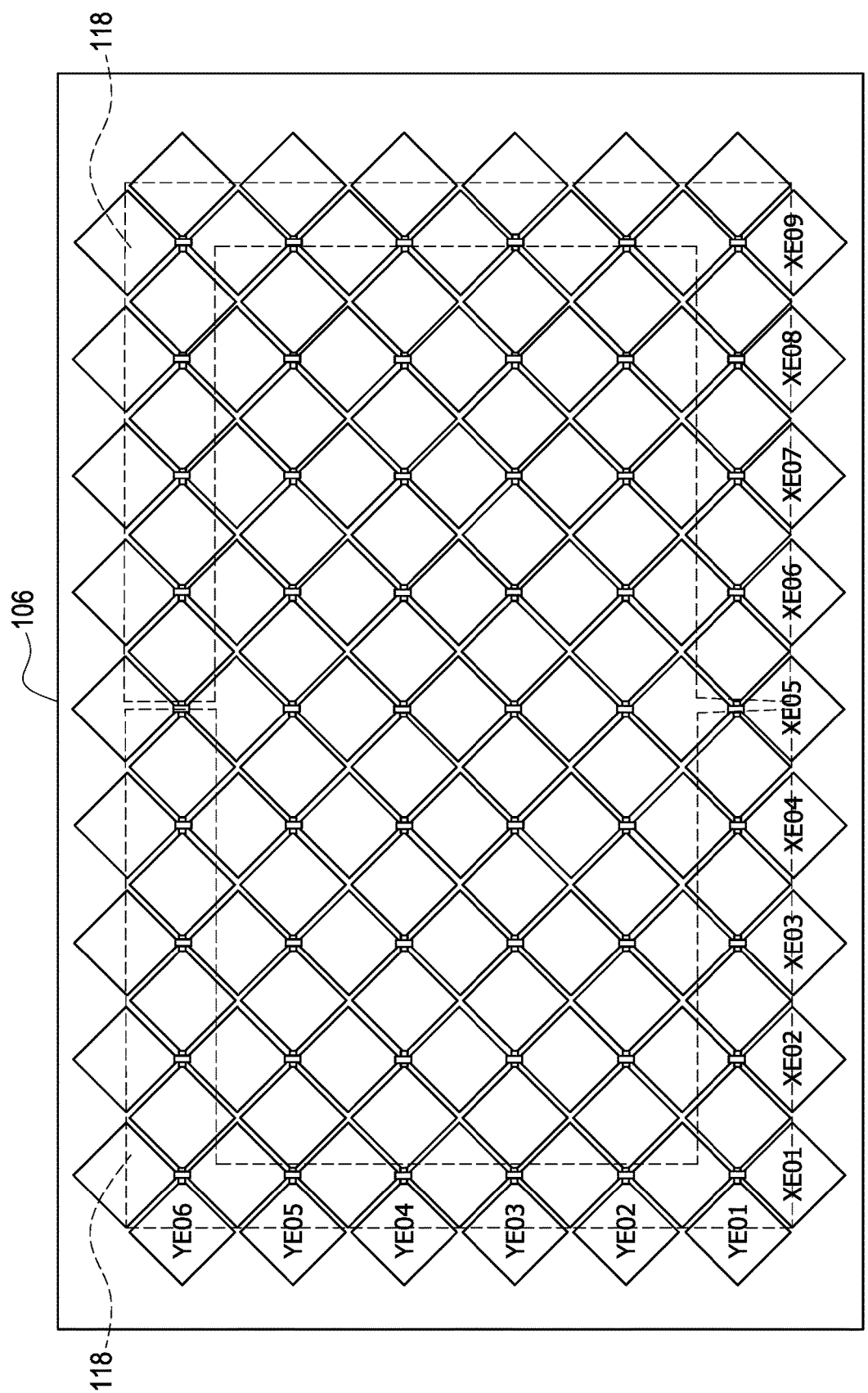
FIG. 8 shows a schematic view of another electrode distribution when the organic light emitting display apparatus of the present invention sensing mutual-capacitance.
Figure 16:
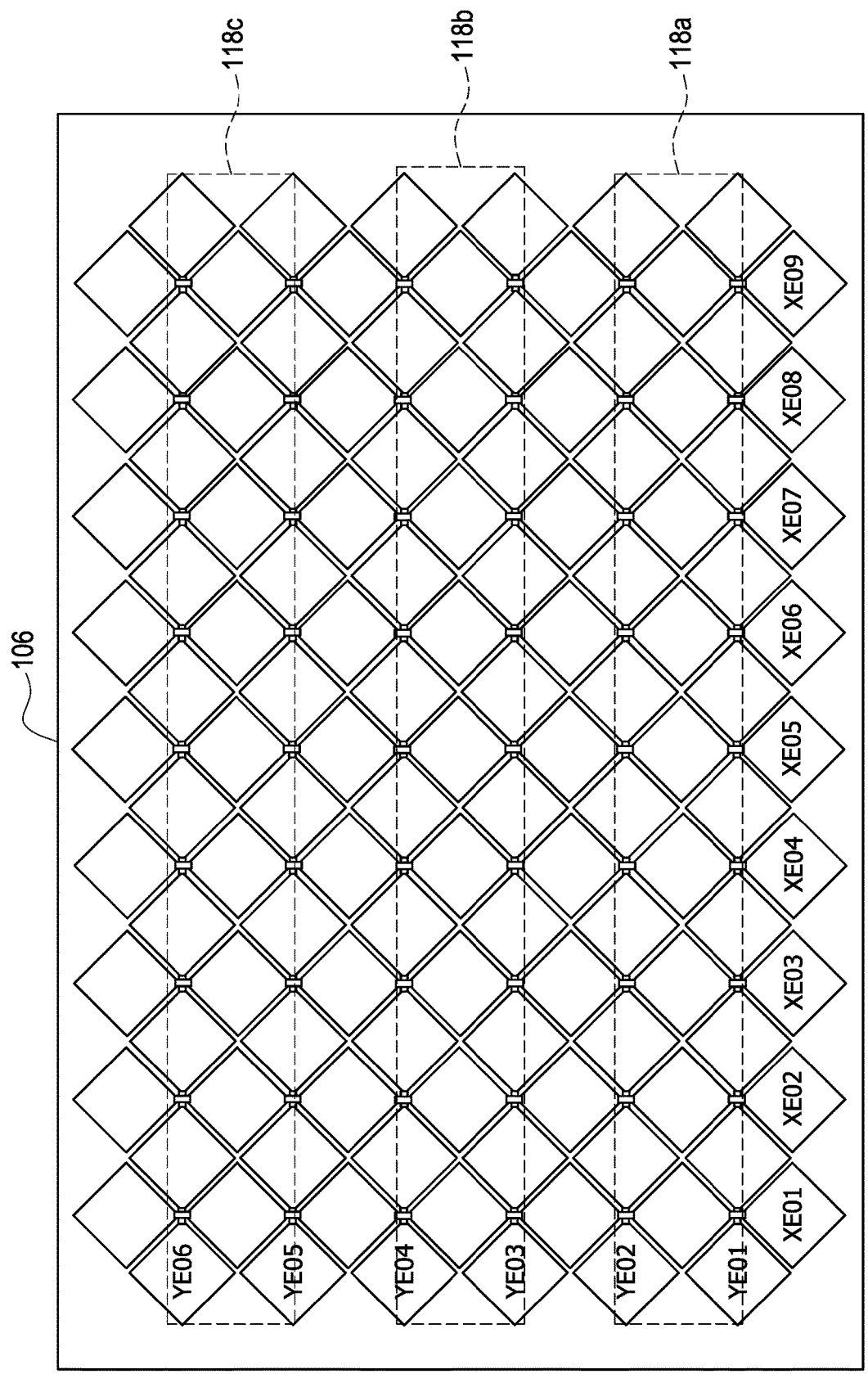
FIG. 16 shows a schematic view of another electrode distribution when the organic light emitting display apparatus of the present invention sensing mutual-capacitance.

Refer to FIG. 7 again, FIG. 7 shows a schematic view of an electrode distribution when the organic light emitting display apparatus of the present invention sensing mutual-capacitance. Two-dimension distribution of the first touch electrodes XE01-07 shown in FIG. 5A and the second touch electrodes YEn can be, for example, distribution of the first touch electrodes XE01-06 and the second touch electrodes YE01-04 shown in FIG. 7. The first touch electrodes XE01-06 are arranged along a first direction, the second touch electrodes YE01-04 are arranged along the second direction, while the first direction and second direction are different direction and may be almost perpendicular. Moreover, the force sensing electrode 118 is square frame shaped. FIG. 8 shows a schematic view of another electrode distribution when the organic light emitting display apparatus of the present invention sensing mutual-capacitance. In the embodiment, the first touch electrodes XE01-09 and the second touch electrodes YE01-06 are coplanar and insulated from each other. The first touch electrodes XE01-09 are electrically connected with each other by cross bridge, and two force sensing electrodes 118 together form the square frame shape. FIG. 16 shows a schematic view of another electrode distribution when the organic light emitting display apparatus of the present invention sensing mutual-capacitance, the distribution of the touch electrodes is similar to that shown in FIG. 8, however, the organic light emitting display apparatus 10 includes three force sensing electrodes 118a-c isolated from each other. Also refer to FIG. 5A and FIG. 16, By sensing method shown in FIG. 5A, it can be known that a touch events occurs at point on the cross position of the first touch electrode XE04 and the second touch electrode YE04, then the corresponding force sensing electrode 118b is corresponding force sensing electrode.

Figure 5B:
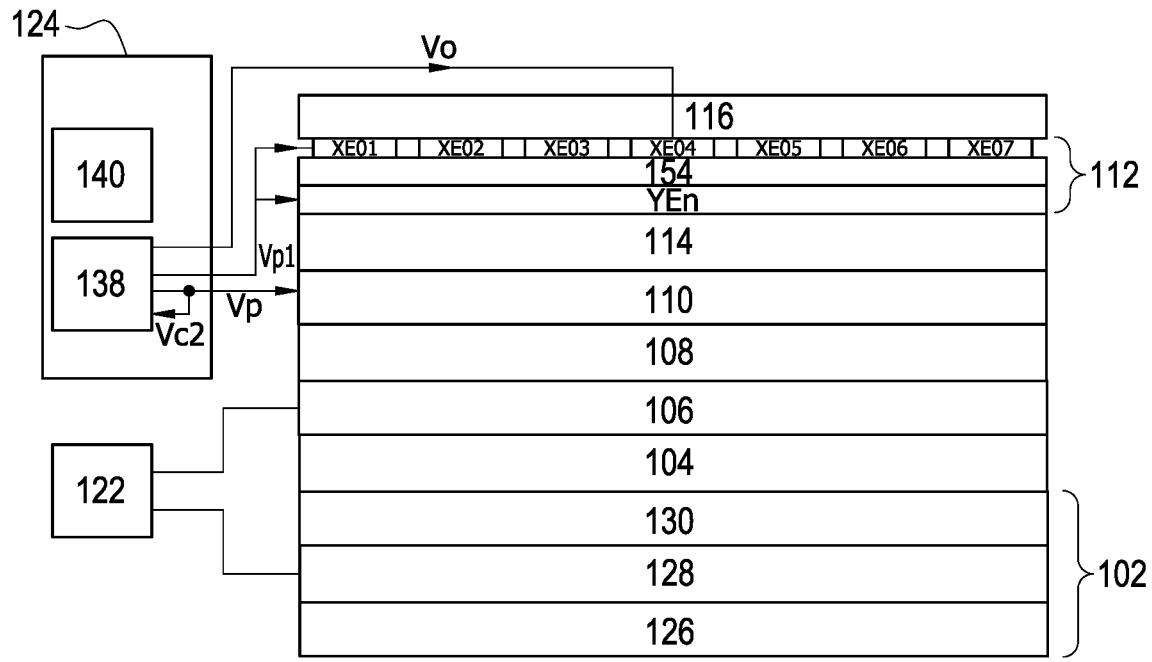
FIG. 5B shows a block diagram including circuit of the organic light emitting display apparatus with force and touch sensing according to an embodiment of the present invention.

Please refer to FIG. 5B, FIG. 5B shows a block diagram including circuit of the organic light emitting display apparatus with force and touch sensing according to an embodiment of the present invention. The elements shown in FIG. 5B, which are the same as that in figures mentioned above are not described repeatedly for brevity. The self-capacitance sensing circuit 138 is further connected to the touch electrode layer 112. During force sensing, the self-capacitance sensing circuit 138 transmits a force capacitance-exciting signal Vp to the force electrode layer 110 (for example, to corresponding force sensing electrode 118b), and receives a force sensing signal Vc2 from the force electrode layer 110, for obtaining forcing value. Besides, the self-capacitance sensing circuit 138 also transmits a counter exciting signal Vo to a selected first touch electrode (for example, the first touch electrode XE04 of corresponding touch point), and transmits a shielding signal Vp1 to the non-selected first touch electrodes XE01-03, XE05-07 and the second touch electrodes YEn, for shielding the interference. The counter exciting signal Vo is an inverting signal of the force capacitance exciting signal Vp, or grounded. The shielding signal Vp1 is a signal with same phase as that of the force capacitance-exciting signal Vp.

Figure 5C:
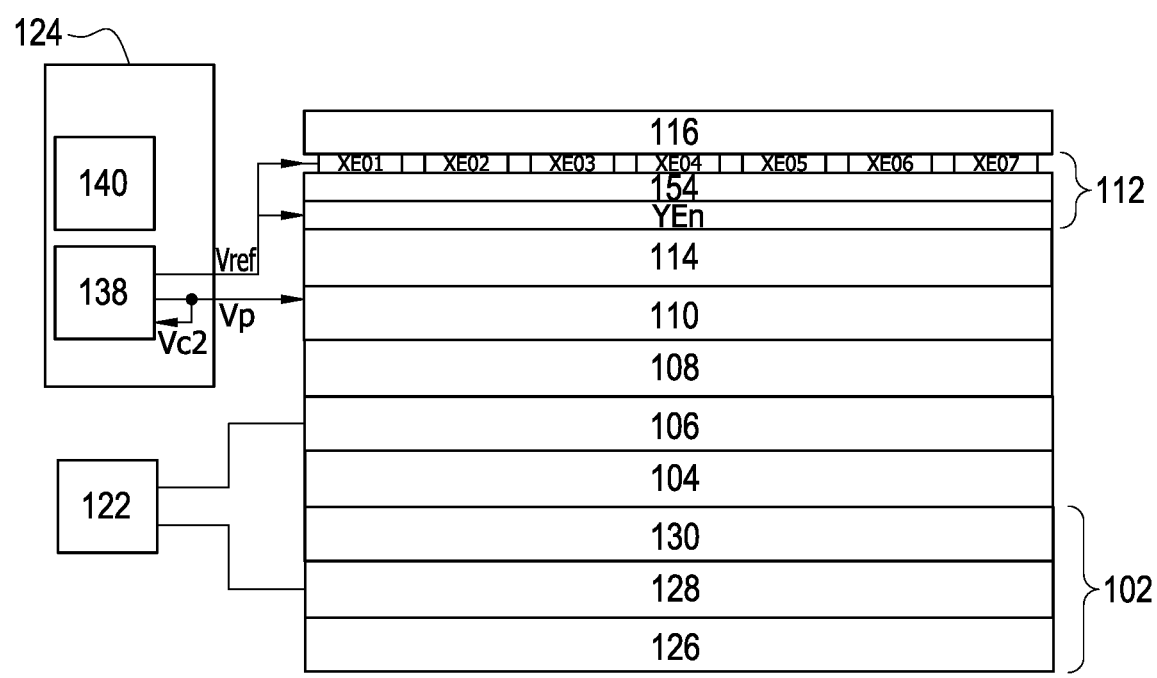
FIG. 5C shows a block diagram including circuit of the organic light emitting display apparatus with force and touch sensing according to an embodiment of the present invention.

Please refer to FIG. 5C, FIG. 5C shows a block diagram including circuit of the organic light emitting display apparatus with force and touch sensing according to an embodiment of the present invention. The elements shown in FIG. 5C, which are the same as that in figures mentioned above are not described repeatedly for brevity. During force sensing, the self-capacitance sensing circuit 138 transmits a dc reference voltage Vref to the first touch electrodes XE01-07 and the second touch electrode YEn, and transmits a force capacitance exciting signal Vp to the force electrode layer 110 and receives a force sensing signal Vc2 from the force electrode layer 110, for obtaining forcing value.

Figure 12:
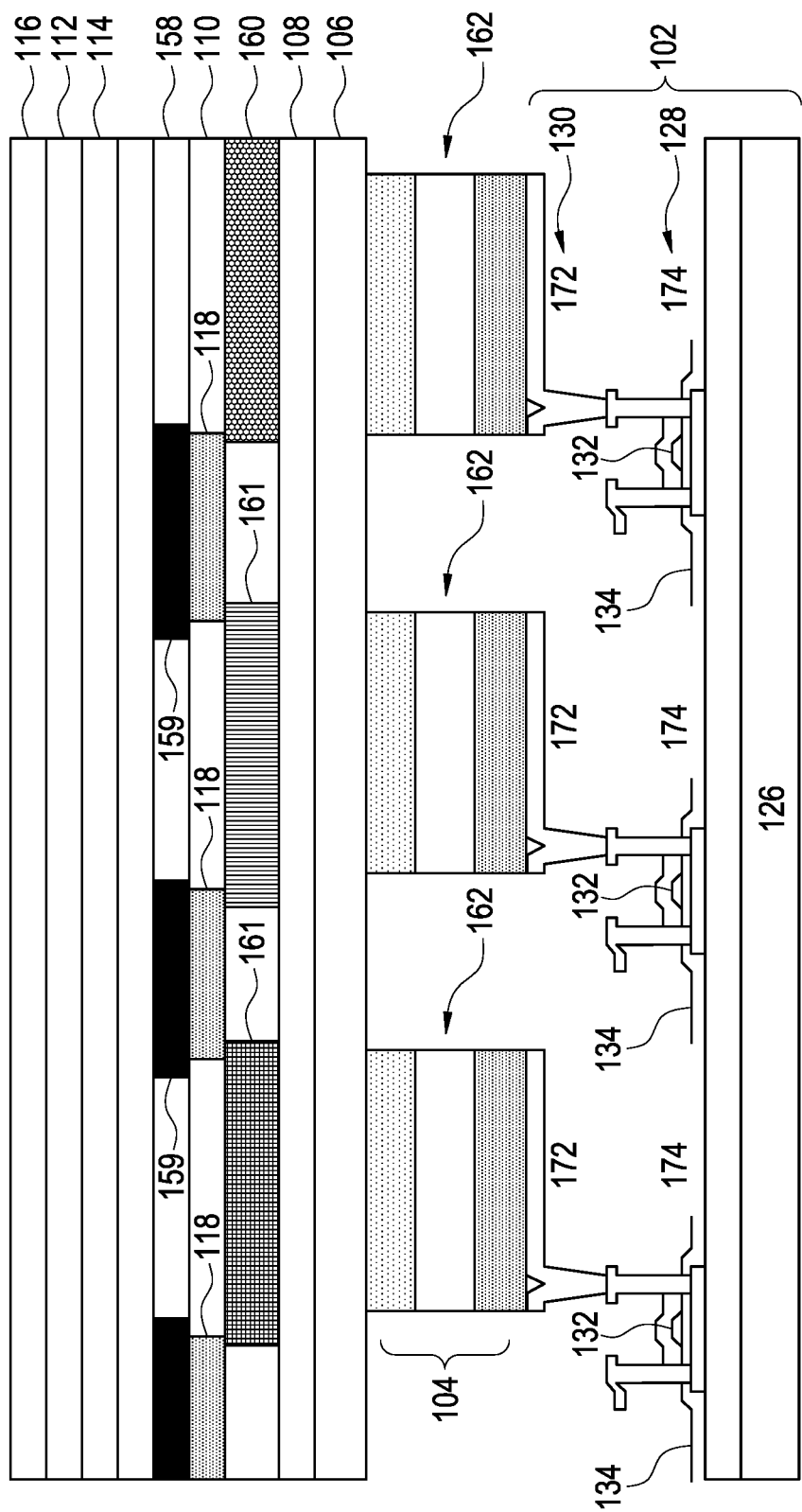
FIG. 12 shows a schematic view of a structure of an organic light emitting display apparatus with force and touch sensing according to another embodiment of the present invention.

Please refer to FIG. 12, FIG. 12 shows a schematic view of a structure of an organic light emitting display apparatus with force and touch sensing according to another embodiment of the present invention. The elements shown in FIG. 12, which are the same as that in FIG. 10 are not described repeatedly for brevity. As shown in FIG. 12, the force electrode layer 110 is a metal grid force electrode layer, thus the force sensing electrodes 118 of the force electrode layer 110 are metal grid electrodes. As shown in FIG. 12, the force electrode layer 110 is under the black matrix layers 158 and each of the force sensing electrodes 118 is shielded by a corresponding black matrix material 159, for avoiding the metal grid electrode reflected light effect.

Figure 13:
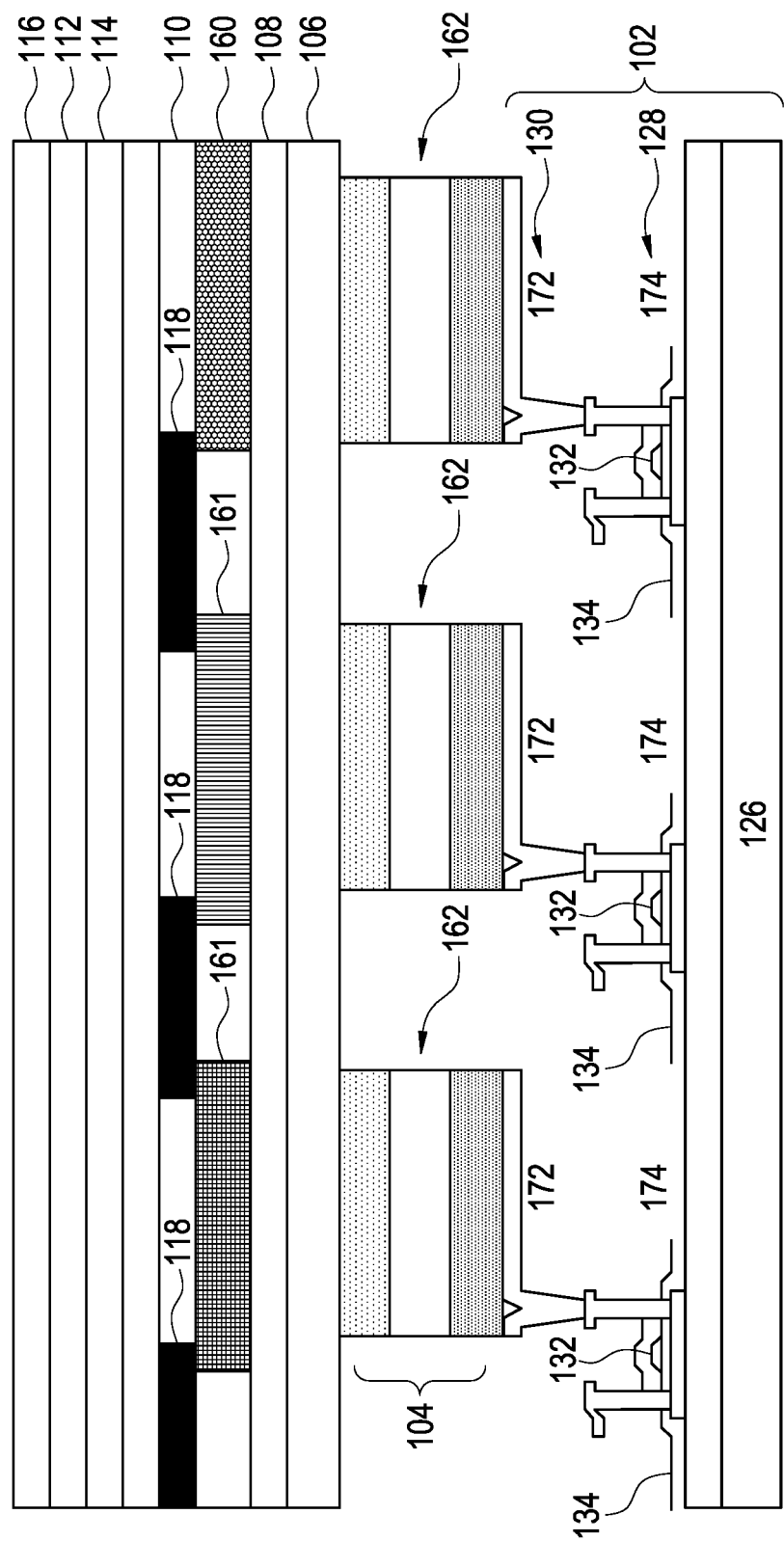
FIG. 13 shows a schematic view of a structure of an organic light emitting display apparatus with force and touch sensing according to another embodiment of the present invention.

Please refer to FIG. 13, FIG. 13 shows a schematic view of a structure of an organic light emitting display apparatus with force and touch sensing according to another embodiment of the present invention. The elements shown in FIG. 13, which are the same as those in FIG. 12 mentioned above, are not described repeatedly for brevity. As shown in FIG. 13, the black matrix layers 158 can be dispensed with. Moreover, the force electrode layer 110 is a black metal grid force electrode layer, thus the force sensing electrodes 118 of the force electrode layer 110 are black metal grid force electrodes, wherein conductive material, such as chromium metal, is used for manufacturing the black metal grid force electrodes.

Figure 14:
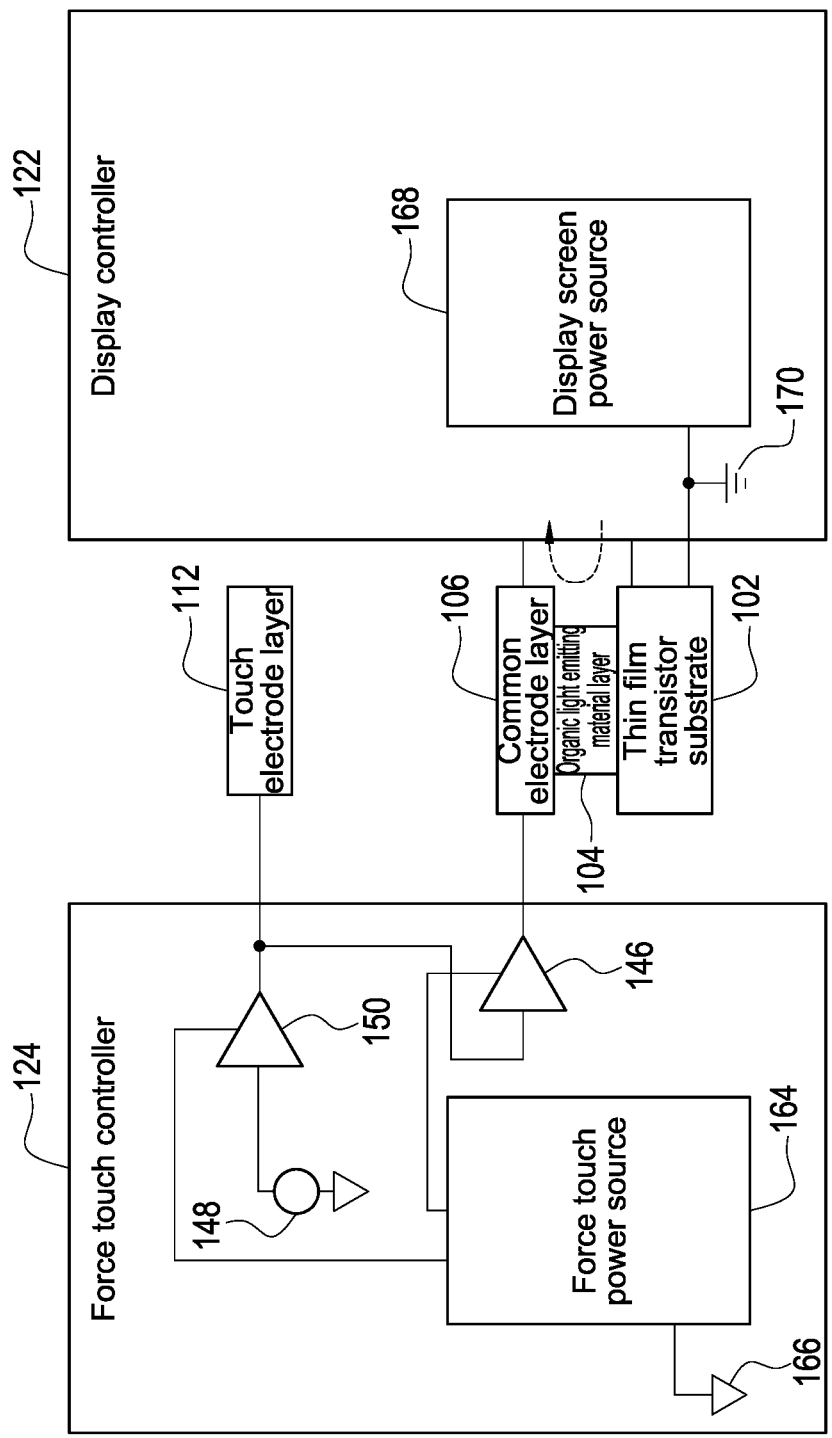
FIG. 14 shows a conceptual diagram of a force touch controller and a display controller of the present invention with separated power sources.

Please refer to FIG. 14; FIG. 14 shows a schematic diagram of a force touch controller and a display controller of the present invention with separated power sources. The elements shown in FIG. 14, which are the same as that in figures mentioned above are not described repeatedly for brevity. The force touch controller 124 further includes a force and touch power source 164 and a force and touch grounded end 166, the force and touch power source 164 provides power to the elements in the force touch controller 124, such as the first amplifier 146 and the signal end driver 150 etc. The display controller 122 includes a display screen power source 168 and a display grounded end 170, the display screen power source 168 provides power to the elements in the display controller 122. Referring to operation in FIG. 3A again, during touch sensing, the force touch controller 124 transmits the touch capacitance exciting signal VT to the touch electrode layer 112, and transmits the auxiliary signal VT1 to the common electrode layer 106. There is only a physical connection point between the display controller 122 and the force touch controller 124 (for example, connection point between the first amplifier 146 and the common electrode layer 106), and the force and touch grounded end 166 and the display grounded end 170 are different grounded ends, making no common current loop between the display controller 122 and the force touch controller 124, prevent the noise of the display controller 122 from influencing measure result of the force touch controller 124. Refer to FIG. 3B together, during force sensing, the force touch controller 124 transmits the force capacitance exciting signal Vp to the force electrode layer 110, and transmits the shielding signal Vp1 to the common electrode layer 106. Similarly, during force measuring, there can be no current loop between the force touch controller 124 and the display controller 122.

Figure 15:
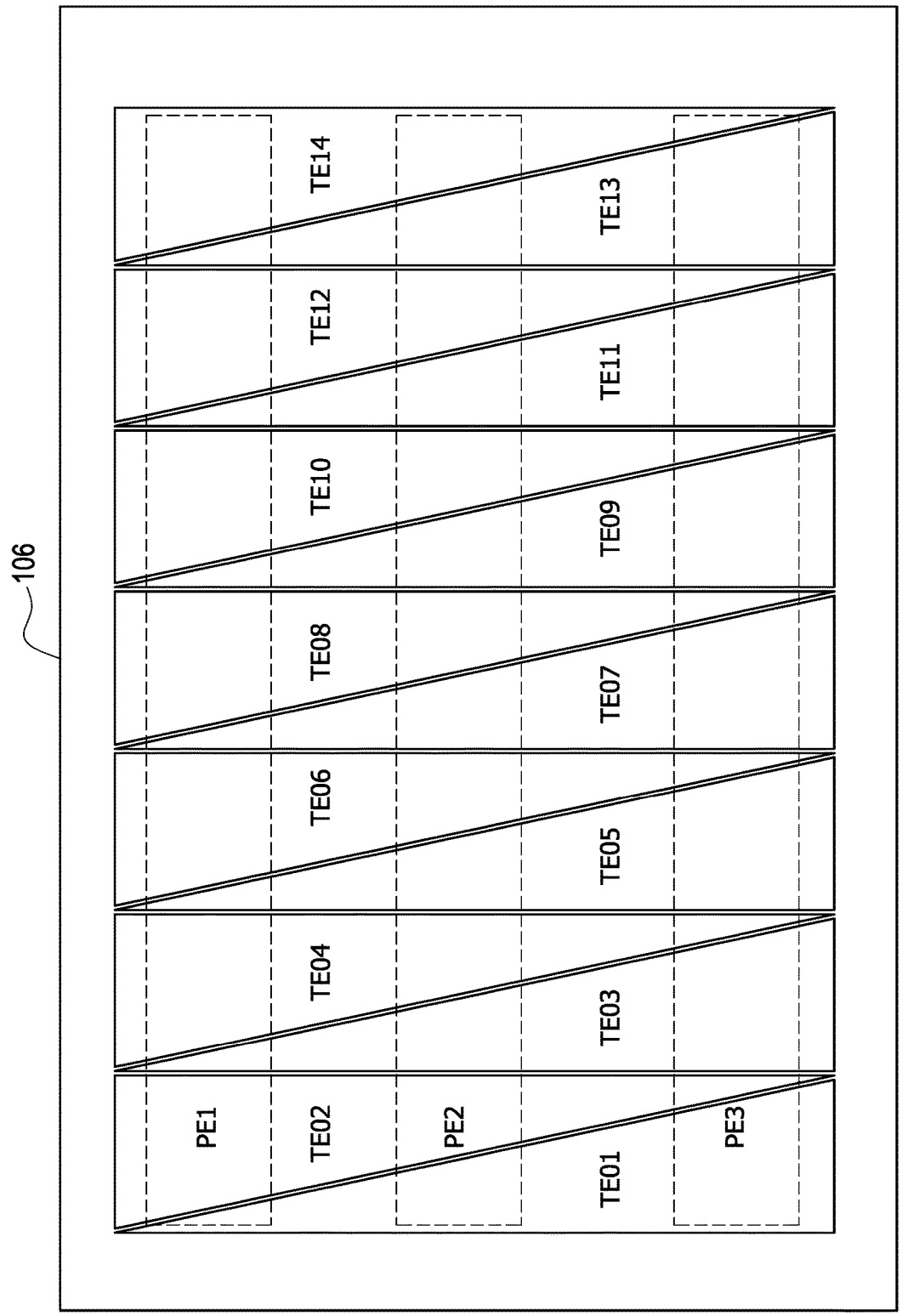
FIG. 15 shows a top view of another electrode distribution of the organic light emitting display apparatus of the present invention with force and touch sensing.

Please refer to FIG. 15, FIG. 15 shows a top view of another electrode distribution of the organic light emitting display apparatus of the present invention with force and touch sensing. The distribution of electrodes shown in FIG. 15 is similar to that shown in FIG. 6, while the organic light emitting display apparatus 10 includes a plurality of force sensing electrodes PE1-3.

The present invention provides effect of making the organic light emitting display include force sensing and touch functions.

Thus, particular embodiments have been described. Other embodiments are within the scope of the following claims. For example, the actions recited in the claims may be performed in a different order and still achieve desirable results.

What is claimed is:

1. An organic light emitting display apparatus with force and touch sensing, the organic light emitting display apparatus comprising:
   a thin film transistor substrate;
   an organic light emitting material layer arranged on the thin film transistor substrate;
   a common electrode layer arranged on the organic light emitting material layer, the organic light emitting material layer arranged between the common electrode layer and the thin film transistor substrate;
   a force electrode layer arranged on a side of the common electrode layer, the side being opposite to the organic light emitting material layer;
   a touch electrode layer arranged on a side of the force electrode layer, the side being opposite to the organic light emitting material layer; and
   a resilient material layer arranged between the force electrode layer and the touch electrode layer, or arranged between the common electrode layer and the force electrode layer;
   wherein the force electrode layer comprises at least a force sensing electrode; the touch electrode layer comprises a plurality of touch sensing electrodes;
   wherein the thin film transistor substrate comprises:
   a transistor substrate;
   a thin film transistor layer comprising a plurality of thin film transistors, the plurality of thin film transistors being arranged on the transistor substrate;
   a pixel electrode layer comprising a plurality of pixel electrodes, the plurality of pixel electrodes being arranged on the thin film transistors;
   a plurality of gate lines electrically connected to the plurality of thin film transistors; and
   a plurality of data lines electrically connected to the thin film transistors;
   wherein the organic light emitting display apparatus further comprises a display controller electrically connected to the thin film transistor substrate and the common electrode layer, and a force touch controller electrically connected to the force electrode layer and the touch electrode layer;
   wherein during force sensing operation, the force touch controller outputs an alternating force capacitance exciting signal to the force sensing electrode, and outputs a shielding signal to the common electrode layer, the common electrode layer is different from the force sensing electrode, wherein the shielding signal has same phase as that of the force capacitance exciting signal in force sensing operation;

wherein the touch electrode layer, the force electrode layer, the common electrode layer, and the organic light emitting material layer are sequentially arranged from a top face of the organic light emitting display apparatus;

wherein touch sensing operation and force sensing operation are conducted at different time;

wherein the display controller and the force touch controller have different grounds;

wherein the touch electrode layer is electrically isolated with the display controller; and wherein the display controller and the force touch controller have only one physical connection point therebetween during touch sensing operation, the force touch controller has a connection node electrically connected to the common electrode layer to establish the only one physical connection point, and the connection node is not directly connected to the touch electrode layer.

2. The organic light emitting display apparatus of claim 1, further comprising:
a touch protection layer arranged on a side of the touch electrode layer, the side being opposite to the resilient material layer;
wherein the touch protection layer is a substrate or a cured coating layer.

3. The organic light emitting display apparatus of claim 1, further comprises:
a color filtering structure arranged between the touch electrode layer and the common electrode layer.

4. The organic light emitting display apparatus of claim 1, wherein the touch sensing electrodes are transparent conductive electrodes, and a total area of the touch sensing electrodes covers more than 90 percentage of an area of the force sensing electrode.

5. The organic light emitting display apparatus of claim 1, wherein the force sensing electrode is a transparent conductive electrode.

6. The organic light emitting display apparatus of claim 1, wherein the force sensing electrode is a metal grid electrode.

7. The organic light emitting display apparatus of claim 1, wherein the display controller sequentially outputs a gate signal to a gate line, and the display controller outputs a data signal to the plurality of data lines and outputs a dc volt signal to the common electrode layer for displaying operation.

8. The organic light emitting display apparatus of claim 1, wherein the resilient material layer is compressively deformed under pressure, and restores to original shape and volume if pressure is not present.

9. The organic light emitting display apparatus of claim 1, wherein there is no current loop between the force touch controller and the display controller during force sensing operation.

10. The organic light emitting display apparatus of claim 1, wherein the force touch controller comprises a self-capacitance sensing circuit connected to the force electrode layer.

11. The organic light emitting display apparatus of claim 1, wherein the force touch controller comprises a mutual-capacitance sensing circuit connected to the touch electrode layer.

12. The organic light emitting display apparatus of claim 1, wherein the force touch controller receives a force sensing signal from the force sensing electrode for force sensing.

13. The organic light emitting display apparatus of claim 12, wherein the force touch controller transmits a counter exciting signal to a selected touch sensing electrode when the force touch controller performs the force sensing.

14. The organic light emitting display apparatus of claim 13, wherein the counter exciting signal is an inverting signal of the force capacitance exciting signal, a dc volt signal, or a signal with a multiple smaller than 1 and same phase as that of the force capacitance exciting signal.

15. The organic light emitting display apparatus of claim 1, wherein the force touch controller outputs a counter exciting signal to the common electrode layer, and receives a force sensing signal from the force sensing electrode for force sensing, the counter exciting signal is an inverting signal of the force capacitance exciting signal, a dc volt signal, or a signal with a multiple smaller than 1 and same phase as that of the force capacitance exciting signal.

16. The organic light emitting display apparatus of claim 15, wherein the force touch controller further outputs the shielding signal to the touch sensing electrodes of the touch electrode layer when the force touch controller performs the force sensing.

17. The organic light emitting display apparatus of claim 1, wherein the force touch controller outputs an alternating touch capacitance exciting signal sequentially or randomly to a selected touch sensing electrode, and receives a touch sensing signal from the touch sensing electrode for touch sensing.

18. The organic light emitting display apparatus of claim 17, wherein when the force touch controller performs touch sensing, the force touch controller outputs an auxiliary signal to the force sensing electrode, the auxiliary signal has same phase as that of the touch capacitance exciting signal.

19. The organic light emitting display apparatus of claim 1, wherein the touch electrode layer comprises a plurality of first touch electrodes and a plurality of second touch electrodes, the force touch controller outputs an alternating touch driving signal sequentially or randomly to a selected one of the first touch electrodes, and receives a touch sensing signal from a selected one of the second touch electrodes for touch sensing.

* * * * *